(12) United States Patent
Kim et al.

(10) Patent No.: US 8,504,025 B2
(45) Date of Patent: Aug. 6, 2013

(54) APPARATUS AND METHOD FOR TRANSMITTING AN UPLINK PILOT USING A SCANNING INTERVAL IN A MOBILE COMMUNICATION SYSTEM

(75) Inventors: Dai-Kwan Kim, Seoul (KR); Jong-Hyung Kwun, Seongsam-si (KR); Jung-Hoon Cheon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 934 days.

(21) Appl. No.: 12/048,513

(22) Filed: Mar. 14, 2008

(65) Prior Publication Data
US 2008/0227448 A1    Sep. 18, 2008

(30) Foreign Application Priority Data
Mar. 14, 2007 (KR) .................. 10-2007-0024823

(51) Int. Cl.
*H04B 7/00* (2006.01)
*H04W 4/00* (2009.01)
*H04J 3/06* (2006.01)

(52) U.S. Cl.
USPC ........... 455/434; 455/500; 370/329; 370/350

(58) Field of Classification Search
USPC .................. 455/436–442, 500; 370/331, 332, 370/337, 329, 350
See application file for complete search history.

(56) References Cited

U.S. PATENT DOCUMENTS

| | | | | |
|---|---|---|---|---|
| 5,430,761 A * | 7/1995 | Bruckert et al. | ............... | 375/144 |
| 6,430,414 B1 * | 8/2002 | Sorokine et al. | ............... | 455/442 |
| 7,158,493 B1 * | 1/2007 | Uhlik et al. | ................... | 370/329 |
| 7,215,956 B2 * | 5/2007 | Liu et al. | ........................ | 455/434 |
| 2005/0250498 A1 * | 11/2005 | Lim et al. | ....................... | 455/436 |
| 2005/0282547 A1 * | 12/2005 | Kim et al. | ..................... | 455/436 |
| 2006/0040662 A1 * | 2/2006 | Kim et al. | ..................... | 455/434 |

FOREIGN PATENT DOCUMENTS

| KR | 10-2002-0065627 A | 8/2002 |
|---|---|---|
| KR | 10-2006-0067403 A | 6/2006 |
| KR | 10-2007-0000307 A | 1/2007 |

* cited by examiner

*Primary Examiner* — Nizar Sivji
(74) *Attorney, Agent, or Firm* — Jefferson IP Law, LLP

(57) ABSTRACT

An apparatus and method for transmitting an UpLink (UL) pilot using a scanning interval in a mobile communication system are provided. The method includes receiving a scanning response message including information on a UL pilot channel allocation mode from a serving Base Station (BS), measuring each DownLink (DL) channel state using DL signals of one or more neighboring BSs and transmitting a UL pilot to each of the one or more neighboring BSs in the UL pilot channel allocation mode, during a scanning duration. Accordingly, both UL and DL Quality of Service (QoS) may be considered during a handover operation.

30 Claims, 7 Drawing Sheets

APPARATUS AND METHOD FOR TRANSMITTING AN UPLINK PILOT USING A SCANNING INTERVAL IN A MOBILE COMMUNICATION SYSTEM

PRIORITY

This application claims the benefit under 35 U.S.C. §119 (a) of a Korean patent application filed in the Korean Intellectual Property Office on Mar. 14, 2007 and assigned Serial No. 2007-24823, the entire disclosure of which is hereby incorporated by reference.

BACKGROUND OF THE INVENTION

1. Field of the Invention

The present invention relates to an apparatus and method for transmitting an UpLink (UL) pilot using a scanning interval in a mobile communication system. More particularly, the present invention relates to a scanning apparatus and method for a handover taking into consideration both UL and DownLink (DL) channel states between a Mobile Station (MS) and a Base Station (BS).

2. Description of the Related Art

In a cellular mobile communication system, a user of a subscriber terminal is provided service by a serving Base Station (BS). In such a system, a user may continue a conversation or other use of their subscriber terminal while they are traveling or otherwise in motion. However, a subscriber terminal may encounter a situation in which the communication environment with a neighboring BS is better than that of the serving BS. This may occur for several reasons such as a proximity shift of the subscriber terminal from the serving BS to the neighboring BS, a change of propagation environment, or a sudden increase in the number of subscriber terminals within a specific cell during communication. For example, as illustrated in FIG. 1, during communication with a BS1 103, an MS2 101 can encounter a situation in which the communication environment with a neighboring BS2 105 is better than that of the serving BS1 103. In such a situation, the subscriber terminal, the serving BS, and the neighboring BS must recognize this change of communication environment and establish a new communication path with the optimal BS using a handover from the serving BS to a neighboring BS. Moreover, such recognition and handover must be performed efficiently so that service to the subscriber terminal is not interrupted.

In the conventional art, when there is a request for a handover to a neighboring BS or a neighbor sector according to a change of a user's communication environment, a user subscriber terminal or Mobile Station (MS) measures a channel state with a neighboring BS on the basis of a DownLink (DL) signal from the neighboring BS. Using the channel state information, the MS determines if a handover is appropriate. However, the conventional art has a problem in that handover is decided using only DL channel state information without considering an UpLink (UL) channel state. Accordingly, accuracy decreases and it is difficult to satisfy UL Quality of Service (QoS).

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting an UpLink (UL) pilot using a scanning interval in a mobile communication system.

Another aspect of the present invention is to provide a scanning apparatus and method for a handover taking into consideration both UL and DownLink (DL) channel states between a Mobile Station (MS) requiring a handover and a Base Station (BS).

The above aspects are addressed by providing an apparatus and method for transmitting a UL pilot using a scanning interval in a mobile communication system.

According to one aspect of the present invention, a method for scanning in a Mobile Station (MS) of a mobile communication system is provided. The method includes receiving a scanning response message including information on a UpLink (UL) pilot channel allocation mode from a serving Base Station (BS) and determining a each DownLink (DL) channel state of each of one or more BSs using respective DL signals of the one or more neighboring BSs and transmitting a UL pilot to each of the one or more neighboring BSs in the UL pilot channel allocation mode, during a scanning duration.

According to another aspect of the present invention, a method for scanning in a Mobile Station (MS) of a mobile communication system is provided. The method includes receiving a scanning response message including information on an UpLink (UL) pilot channel allocation mode from a serving Base Station (BS), performing synchronization with each of one or more neighboring BSs, determining a DownLink (DL) channel state using a DL signal of each of the one or more neighboring BSs, and transmitting a UL pilot to the synchronized one or more neighboring BSs in the UL pilot channel allocation mode, during a scanning duration.

According to a further aspect of the present invention, an information forwarding method for scanning in a Base Station (BS) of a mobile communication system is provided. The method includes receiving a scanning request message from a Mobile Station (MS), transmitting a scanning response message comprising UpLink (UL) pilot channel allocation mode information to the MS and transmitting UL pilot channel instruction messages comprising the UL pilot channel allocation mode information to one or more neighboring BSs.

According still another aspect of the present invention, a method for measuring an UpLink (UL) channel state in a Base Station (BS) of a mobile communication system is provided. The method includes receiving a UL pilot channel instruction message comprising UL pilot channel allocation mode information on a UL pilot channel, which is allocated to a Mobile Station (MS) of a neighboring BS, from the neighboring BS, receiving a UL pilot from the MS using the UL pilot channel allocation mode information and determining a UL channel state with the MS using the received UL pilot.

BRIEF DESCRIPTION OF THE DRAWINGS

The above and other aspects, features and advantages of certain exemplary embodiments of the present invention will become more apparent from the following detailed description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An apparatus and method for transmitting an UpLink (UL) pilot using a scanning interval in a mobile communication system according to exemplary embodiments of the present invention are described below.

Figure 1:
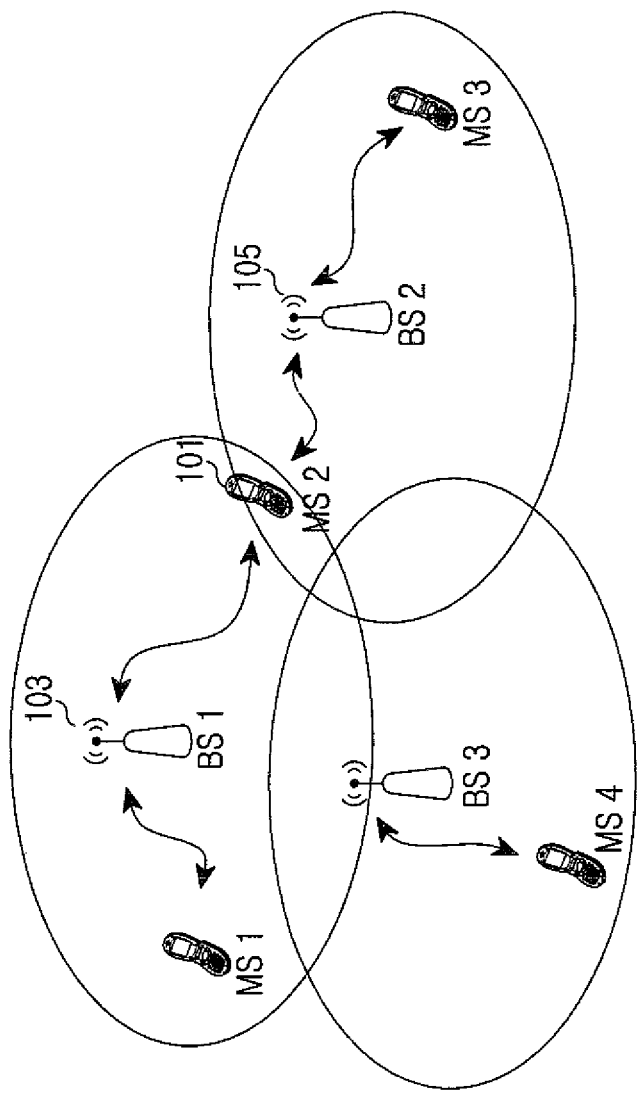
FIG. 1 is a diagram illustrating architecture of a conventional mobile communication system.
Figure 2:
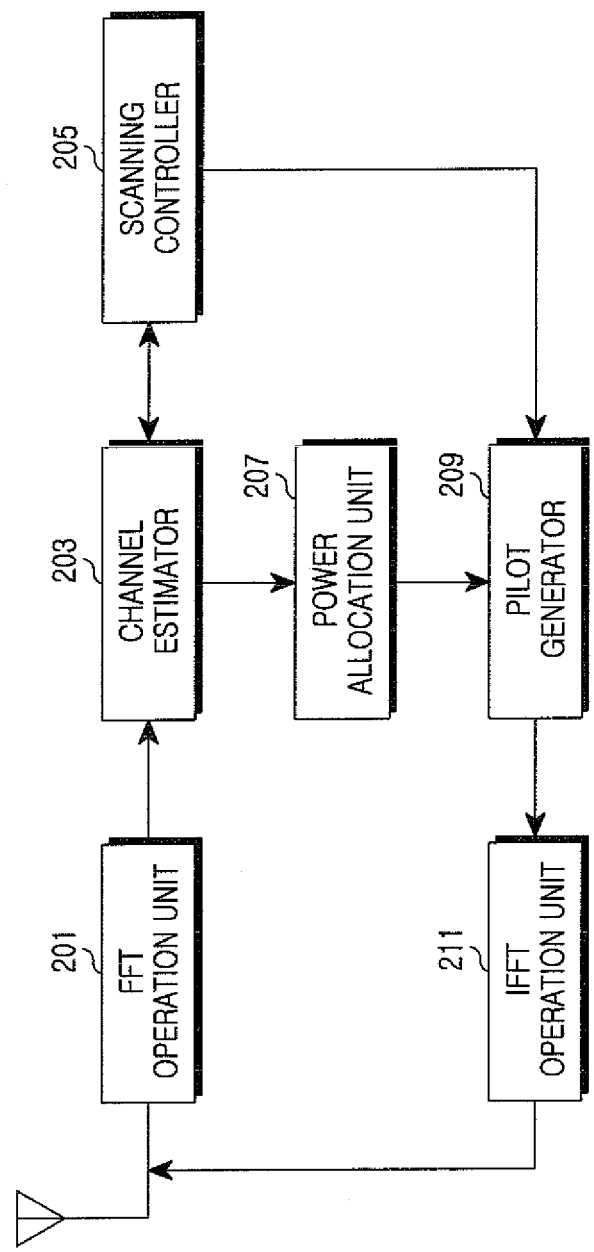
FIG. 2 is a diagram illustrating a construction of a Mobile Station (MS) in a mobile communication system according to an exemplary embodiment of the present invention.

FIG. 2 is a diagram illustrating a construction of a Mobile Station (MS) in a mobile communication system according to an exemplary embodiment of the present invention.

As shown in FIG. 2, the MS includes a Fast Fourier Transform (FFT) operation unit 201, a channel estimator 203, a scanning controller 205, a power allocation unit 207, a pilot generator 209, and an Inverse Fast Fourier Transform (IFFT) operation unit 211.

Referring to FIG. 2, the FFT operation unit 201 RF-processes and converts data, which is received through a receive (Rx) antenna, into a baseband signal. Then the FFT operation unit 201 converts the analog baseband signal into a digital signal, processes the digital signal by an FFT operation, and outputs frequency domain data to the channel estimator 203.

The channel estimator 203 determines a DownLink (DL) channel state of a serving Base Station (BS) using a DL signal received from the serving BS. The channel estimator 203 outputs the determined DL channel state information to the scanning controller 205. Using the DL channel state information of the serving BS, the scanning controller 205 determines if it is required to scan signals of neighboring BSs. For instance, if the DL channel state with the serving BS is poor, the scanning controller 205 may determine that it is required to scan the signals of neighboring BSs. If so, under control of the scanning controller 205, the channel estimator 203 measures a DL channel state of a neighboring BS using a DL signal from the neighboring BS. Once measured, the channel estimator 203 outputs the measured DL channel state of the neighboring BS to both the serving BS and to a power allocation unit 207. At this time, the serving BS can instruct the MS to perform a handover to the most suitable neighboring BS. To provide this instruction, the serving BS considers the DL channel state information of the neighboring BS received from the MS as well as UL channel state information with the MS transmitted by the neighboring BS. Also, using the measured DL channel state information of the neighbor BS, the power allocation unit 207 determines whether to transmit a UL pilot to the neighboring BS.

The scanning controller 205 acquires neighboring BS information using a MOBile_NeighBoR-ADVertisement (MOB_NBR-ADV) message that is periodically received from a serving BS. Using the acquired neighboring BS information, the scanning controller 205 determines whether it is required to scan signals of neighboring BSs during communication with the serving BS. If it is required to scan the signals of the neighboring BSs, for example due to a change of communication environment, the scanning controller 205 transmits a MOBile_SCaNning-REQuest (MOB_SCN-REQ) message to the serving BS to request scanning. In response to the request message, the MS acquires scanning related information, which includes a scanning duration, an interleaving interval, number of times of iteration of a start frame, a UL pilot channel allocation mode, etc., using a MOBile_SCaNning-ReSPonse (MOB_SCN-RSP) message received from the serving BS. Then, the scanning controller 205 controls the channel estimator 203 to measure a DL channel state of a neighboring BS using a DL signal from the neighboring BS during a corresponding scanning duration. The scanning controller also controls the pilot generator 209 to transmit a UL pilot to the neighboring BS in the UL pilot channel allocation mode during a UL interval.

The power allocation unit 207 measures a remnant power amount and determines a reference BS depending on the remnant power amount. Using the reference BS information, the power allocation unit 207 allocates power of the UL pilot taking into consideration only neighboring BSs that are located closer to the MS than the reference BS from among neighboring BSs included in the MOB_NBR-ADV message. Alternatively, the power allocation unit 207 may allocate power of the UL pilot taking into consideration only neighboring BSs having DL channel states greater than or equal to a required threshold value.

Under control of the scanning controller 205, the pilot generator 209 generates a UL pilot which is output to the IFFT operation unit 211 in the UL pilot channel allocation mode. Here, power received from the power allocation unit 207 is applied to the generated UL pilot, thereby differently allocating power to each neighboring BS.

The IFFT operation unit 211 converts input data into time domain sample data by IFFT operation, converts the sample data into an analog signal, RF-processes the analog signal to enable actual transmission, and transmits an RF signal through a transmit (Tx) antenna over a radio channel.

Figure 3:
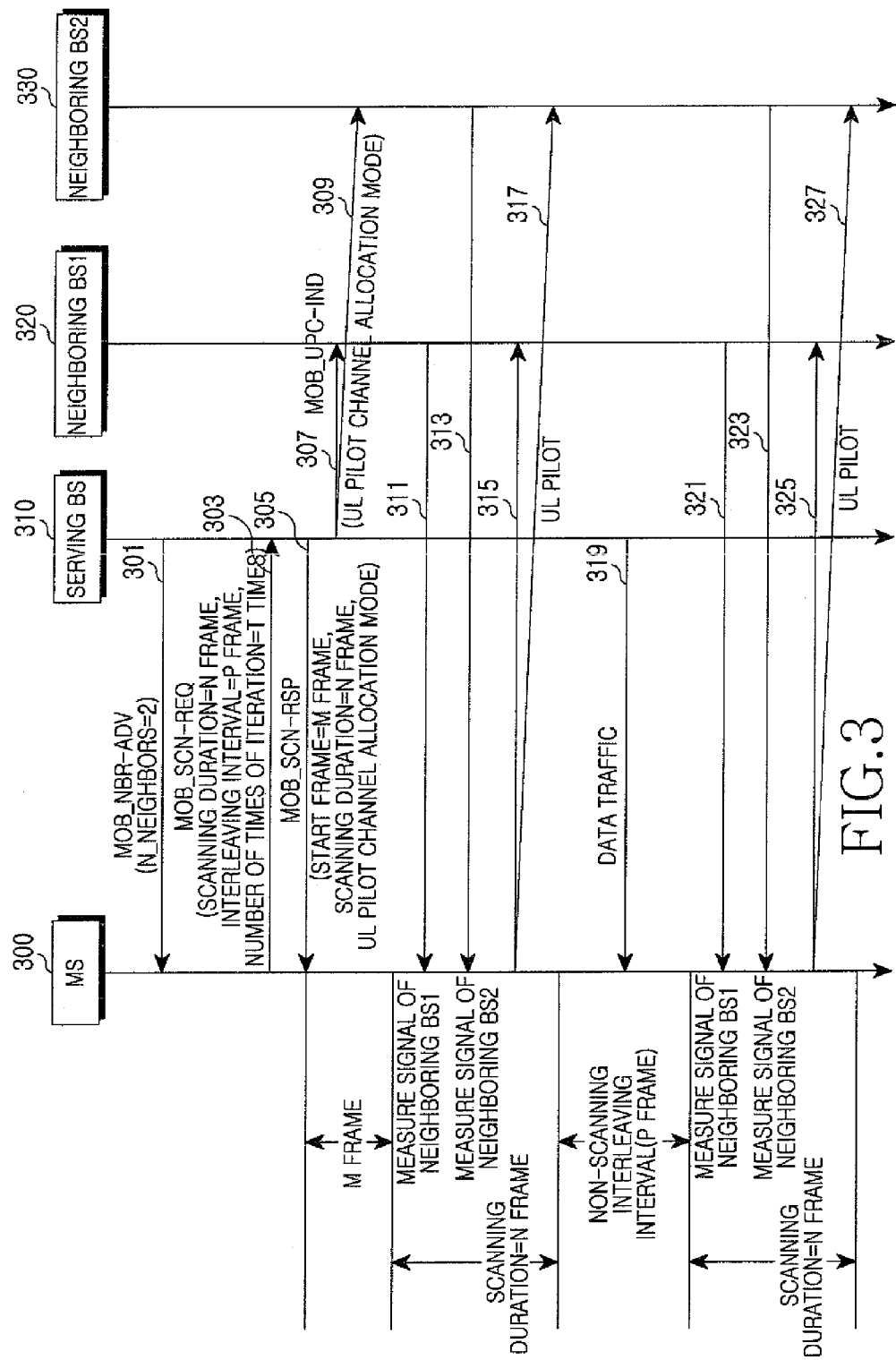
FIG. 3 is a ladder diagram illustrating a process of neighboring BS scanning and pilot transmission in an MS in the case of not requiring separate synchronization in a mobile communication system according to an exemplary embodiment of the present invention.

FIG. 3 is a ladder diagram illustrating a process of neighboring BS scanning and pilot transmission in an MS in the case of not requiring separate synchronization in a mobile communication system according to an exemplary embodiment of the present invention. FIG. 3 shows an exemplary embodiment for the case where a Cyclic Prefix (CP) offset of a neighboring BS signal corresponds to a CP interval of an MS signal. That is, where synchronization between an MS and a neighboring BS is matched.

Referring to FIG. 3, in step 301, a serving BS 310 periodically broadcasts a MOB_NBR-ADV message, which includes information on neighboring BS1 320 and BS2 330, to all MSs 300 within a cell. Of course, while only two neighboring BSs and one MS are illustrated in FIG. 3, these quantities are merely for ease of description and are not considered to limit the invention. The MOB_NBR-ADV message includes the type of transmitted message (Management Message Type), number of neighboring BSs (N_NEIGHBORS), identifiers for the neighboring BSs (Neighbor BS ID), preamble indexes for the neighboring BSs, physical channel frequency profile information on the neighboring BSs (PHY Profile ID), optimized HandOver (HO) process information on the neighboring BSs (HO Process Optimization), neighboring BS information (Type-Length-Value (TLV) Encoded Neighbor Information), and the like. By this message, the MS 300 can acquire information on neighboring BSs.

The MS 300 determines if it is required to scan signals of neighboring BSs 320 and 330 during communication with the serving BS 310. That is, the MS 300 determines whether it is required to perform a handover due to, for example, a change in the communication environment. If so, the MS 300 transmits a MOB_SCN-REQ message to the serving BS 310 and requests a scanning operation in step 303. The MOB_SCN-REQ message includes a scanning duration (N frame), an interleaving interval (P frame), and a number of times of iteration (T times) information.

Upon receiving the MOB_SCN-REQ message, the serving BS 310 allocates a UL pilot channel to the MS 300 and, in step 305, transmits a MOB_SCN-RSP message to the MS 300 and instructs the MS 300 to perform a scanning operation for an N frame (a scanning duration) after an M frame (a start frame). The MOB_SCN-RSP message includes information on a start frame (an M frame), a scanning duration (an N frame), and a UL pilot channel allocation mode for allocating a UL pilot channel to the MS 300. In steps 307 and 309, the serving BS 310 transmits a MOBile_Uplink Pilot Channel-INDication (MOB_UPC-IND) message including UL pilot channel allocation mode information to the neighboring BSs 320 and 330 so that the neighboring BSs 320 and 330 can accurately receive UL pilots that, after DL channel states of the neighboring BSs 320 and 330 are measured, are transmitted by the MS 300 having requested the scanning.

A format of the MOB_UPC-IND message is shown in Table 1 below.

| Syntax | Size | Notes |
|---|---|---|
| UL_Pilot_Command_IE( ){ | — | — |
| Extended-2 UIUC | 4 bits | UL_Pilot_Command_IE( ) = TBD |
| Length | 8 bits | Variable |
| Send Pilot Report Flag | 1 bit | — |
| Num_Pilot_symbols | 3 bits | Total number of pilot symbols being allocated, from 1(0b000) to $2^3$ = 8(0b111) |
| Decimation Value D | 3 bits | Send pilot every $D^{th}$ subcarrier within the pilot allocation. Decimation value D is 2 to the power of (1 plus this value), hence 2, 4, 8, . . . up to maximum of 128, and 0b111 means decimation of 5. |
| Decimation offset randomization | 1 bit | 0 = no randomization of decimation offset<br>1 = decimation offset pseudo-randomly determined |
| for (i=0;i<Num_Pilot_symbols; i++){ | — | — |
| Pilot symbol index | 3 bits | Symbol index within the Pilot Zone, from 1(value 0b000) to $2^3$ = 8(value 0b111) |
| Number of CIDs | 6 bits | Number of CIDs sharing this Pilot allocation |
| for (j = 0; j<Num. of CIDs; j++){ | — | — |
| Shorted basic CID | 12 bits | 12 LSBs of the MS basic CID value |
| Power Control Method | 2 bits | 0b00 = Based on neighbor BSs whose downlink RSSI is beyond required threshold;<br>0b01 = Based on neighbor BS with min. distance;<br>0b10 = Based on neighbor BS with MAX. distance;<br>0b11 = reserved |
| Multi-Antenna Flag | 1 bit | 0 = MS sends pilot first antenna only<br>1 = MS sends pilot all antennas |
| Starting Frequency Band | 7 bits | Out of 96 bands at most(FFT size dependent) |
| Number of frequency bands | 7 bits | Contiguous bands used for Pilot |
| } | — | — |
| } | — | — |
| } | — | — |

Here, the 'Extended-2 UIUC' indicates which content is to follows. The 'Length' represents a length of a message and the 'Send Pilot Report Flag' represents the existence of a pilot report or not, that is, the existence or absence of the content below. The 'Num_pilot_symbols' represents the number of the entire UL pilot symbol, the 'Decimation Value D' represents a periodic relation of pilots to subcarriers (e.g. one pilot every $D^{th}$ subcarrier), and the 'Decimation offset randomization' represents whether to randomize a decimation offset. The 'Pilot symbol index' represents a UL pilot symbol index to be used by a Connection IDentifier (CID) sharing a pilot symbol, the 'Number of CIDs' represents the number of CIDs sharing a pilot symbol, and the 'Shorted basic CID' is an expression of a corresponding CID using a Least Significant Bit (LSB) (12 bits). The 'Power control method' represents a UL pilot power control method, the 'Multi-antenna flag' represents the use or non-use of a multi-antenna, the 'Starting frequency band' represents a starting frequency band, and the 'Number of frequency bands' represents the number of neighbor frequency bands used for pilot transmission. That is, the starting frequency band has been decided and thus, it is determined whether to use any number of neighbor frequency bands.

If the MOB_SCN-RSP message is received, in steps 311 and 313, the MS 300 determines DL channel states of the neighboring BS1 320 and the neighboring BS2 330, that is, performs scanning using DL signals of the neighboring BS1 320 and the neighboring BS2 330 during a scanning duration of an N frame after an M frame. Also, as mentioned above, synchronization exists between the MS 300 and the neighboring BSs so that the MS performs the scanning without additional synchronization with the neighboring BS1 320 and BS2 330. Then, the MS 300 transmits UL pilots to the neighboring BSs 320 and 330 in the UL pilot channel allocation mode without separate synchronization during a UL interval in steps 315 and 317. In an exemplary implementation, the MS may transmit the UL pilots simultaneously. Data transmission/reception cannot be implemented during the scanning duration and the UL pilot transmission is performed at any UL interval during the N frame that is the scanning duration. As will be explained below, the neighboring BSs 320 and 330 can determine UL channel states of the MS 300 using the UL pilot. Then, the MS 300 stops the scanning operation during a non-scanning interleaving interval (a P frame). At this time, in step 319, the serving BS 310 can transmit corresponding data traffic using the non-scanning interleaving interval (the P frame) when there is data to be transmitted to the MS 300.

After that, the steps 311 to 319 are repeatedly executed by the number of times of iteration (T) as illustrated, for example, by steps 321, 323, 325 and 327.

Figure 4:
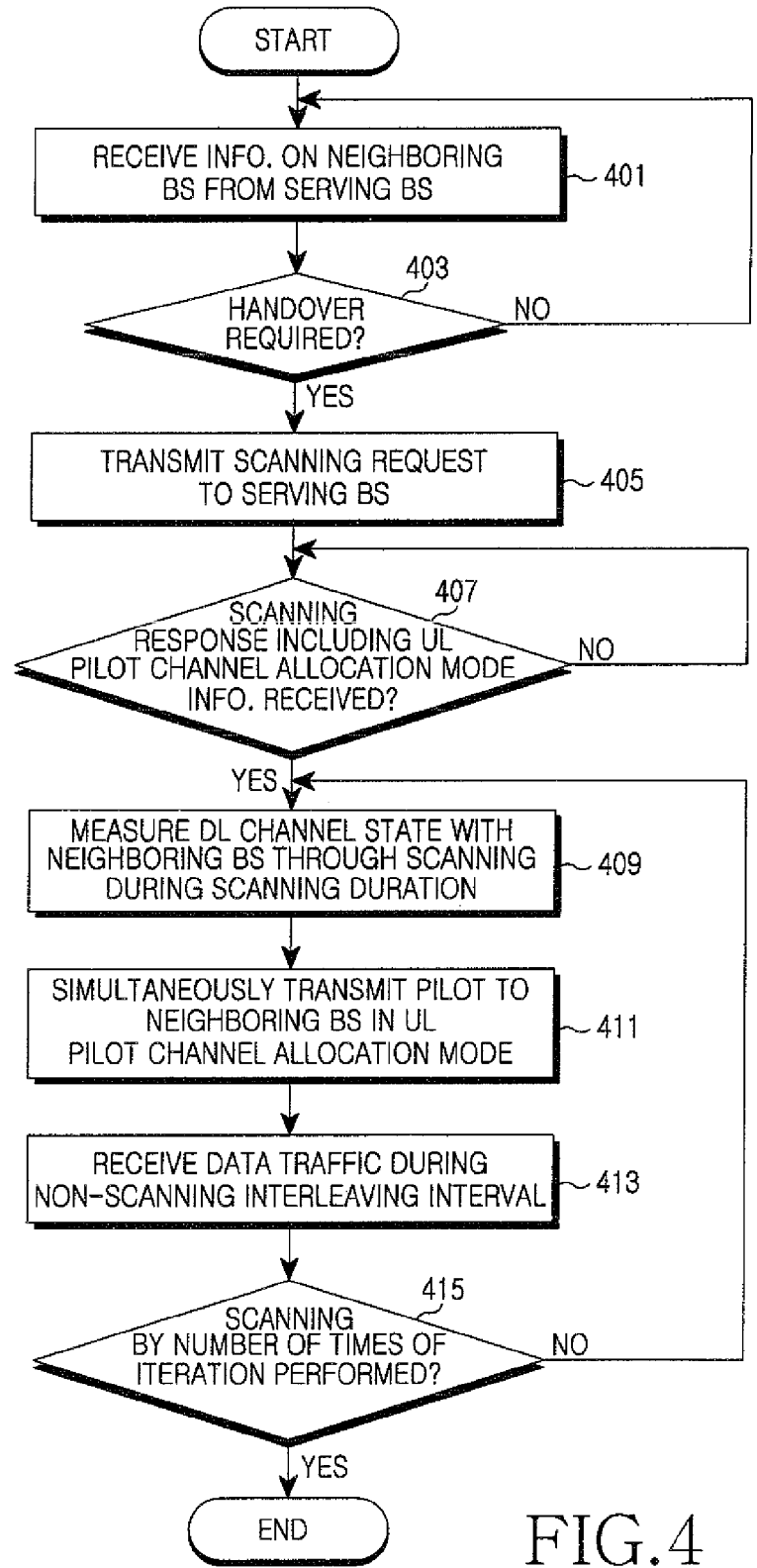
FIG. 4 is a flow diagram illustrating a process of neighboring BS scanning and pilot transmission in an MS of a mobile communication system according to an exemplary embodiment of the present invention.

FIG. 4 is a flow diagram illustrating a process of neighboring BS scanning and pilot transmission in an MS of a mobile communication system according to an exemplary embodiment of the present invention.

Referring to FIG. 4, in step 401, an MS periodically receives a MOB_NBR-ADV message, which includes information on neighboring BSs from a serving BS.

The MS determines whether it is required to scan signals of neighboring BSs during communication with the serving BS in step 403. That is, the MS determines whether it requires handover due to a change in the communication environment. If the handover is not required, the MS returns to step 401 and repeatedly performs subsequent steps. If the handover is otherwise required, in step 405, the MS transmits a MOB_SCN-REQ message to the serving BS and requests a scanning operation. The MOB_SCN-REQ message includes information on a scanning duration (an N frame), an interleaving interval (a P frame), a number of times of iteration (T times), etc.

The MS determines whether it receives a MOB_SCN-RSP message from the serving BS in step 407. The MOB_SCN-RSP message instructs the MS to perform the scanning operation and includes information on a start frame (an M frame), a scanning duration (an N frame), and a UL pilot channel allocation mode for the MS.

If the MOB_SCN-RSP message is received, in step 409, the MS 300 scans DL signals from neighboring BSs and measures DL channel states of the neighboring BSs during a scanning duration of an N frame after an M frame. In an exemplary implementation, the MS scans the DL signals without additional synchronization with the neighboring BSs. In step 411, the MS transmits UL pilots to the neighboring BSs in the UL pilot channel allocation mode during a UL interval. Again, in an exemplary implementation, the UL pilots are transmitted without separate synchronization. Data transmission/reception cannot be implemented during the scanning duration and the UL pilot transmission is performed at any UL frame interval during the N frame interval that is the scanning duration.

Then, during a non-scanning interleaving interval (a P frame), the MS stops the scanning operation and receives data traffic from the serving BS in step 413.

In step 415, the MS determines whether it has performed the scanning operation for the number of times of iteration (T times). If so, the MS terminates the process. Otherwise, the MS returns to step 409 and repeatedly performs the subsequent steps.

Figure 5:
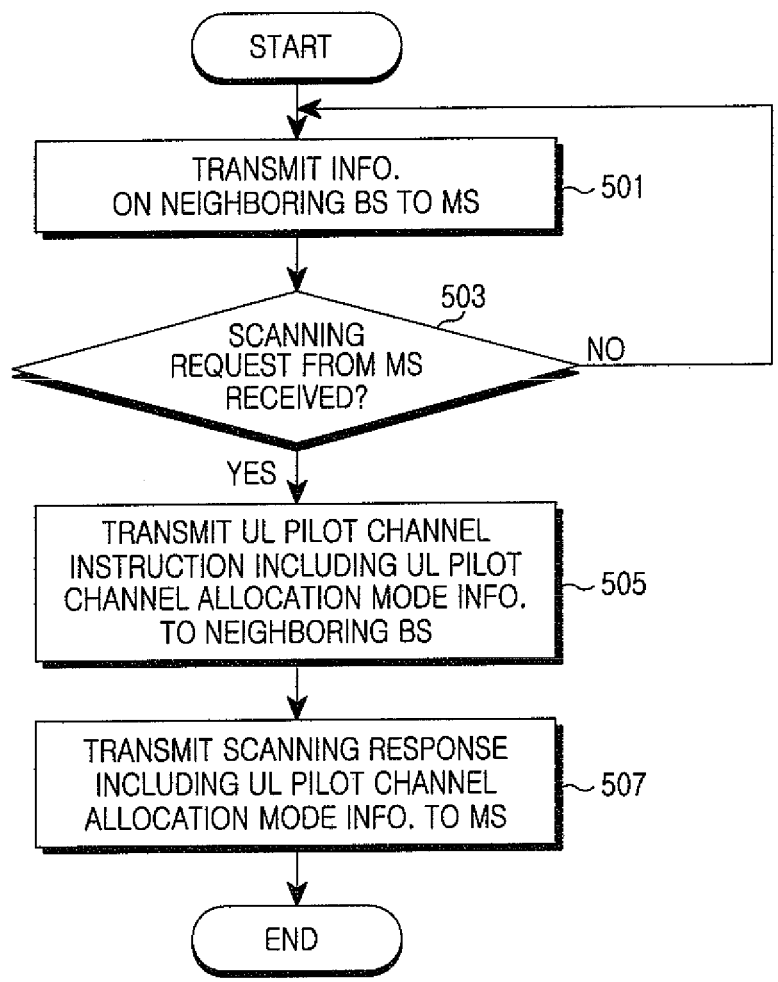
FIG. 5 is a flow diagram illustrating a process of neighboring BS scanning in a serving BS of a mobile communication system according to an exemplary embodiment of the present invention.

FIG. 5 is a flow diagram illustrating a process of neighboring BS scanning in a serving BS of a mobile communication system according to an exemplary embodiment of the present invention.

Referring to FIG. 5, in step 501, a serving BS periodically broadcasts a MOB_NBR-ADV message, which includes information on neighboring BSs, to all MSs within a cell.

In step 503, the serving BS determines whether it receives a MOB_SCN-REQ message from the MS. If the MOB_SCN-REQ message is not received, the serving BS returns to step 501 and repeatedly performs subsequent steps. The MOB_SCN-REQ message is a message for requesting a scanning operation of a scanning duration (an N frame), an interleaving interval (a P frame), and a number of times of iteration (T times).

If the MOB_SCN-REQ message is otherwise received, the serving BS allocates a UL pilot channel to the MS and, in step 505, transmits a MOB_UPC-IND message including UL pilot channel allocation mode information to the neighboring BSs so that the neighboring BSs can accurately receive UL pilots that, after DL channel states of the neighboring BSs are measured, are transmitted by the MS that requested the scanning.

In step 507, the serving BS transmits a MOB_SCN-RSP message to the MS and instructs the MS to perform a scanning operation during an N frame (a scanning duration) after an M frame (a start frame). The MOB_SCN-RSP message includes information on a start frame (an M frame), a scanning duration (an N frame), and a UL pilot channel allocation mode for the MS.

Then, the serving BS terminates the process.

Figure 6:
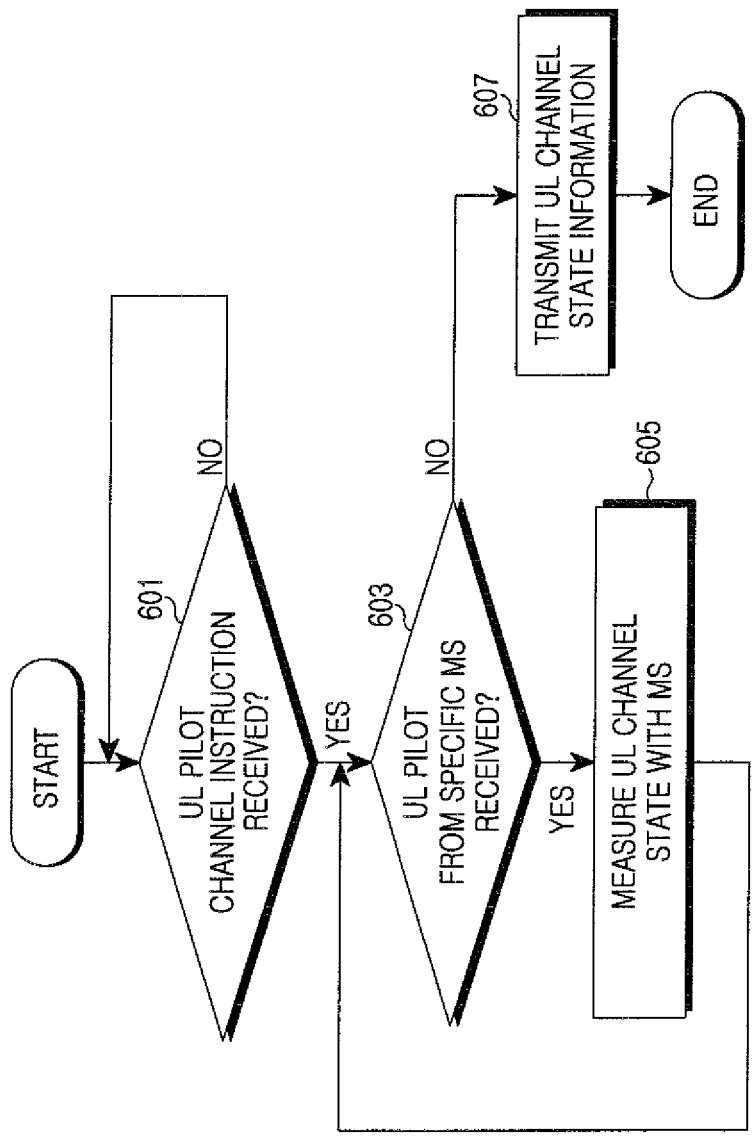
FIG. 6 is a flow diagram illustrating a process of pilot reception in a neighboring BS of a mobile communication system according to an exemplary embodiment of the present invention.

FIG. 6 is a flow diagram illustrating a process of pilot reception in a neighboring BS of a mobile communication system according to an exemplary embodiment of the present invention.

Referring to FIG. 6, in step 601, a neighboring BS determines if it receives a MOB_UPC-IND message including UL pilot channel allocation mode information from another BS, for example, a serving BS of a specific MS.

If the MOB_UPC-IND message is received, the neighboring BS determines whether it receives a UL pilot from the MS in step 603. If the UL pilot is received, the neighboring BS measures a UL channel state with the MS through the UL pilot using the UL pilot channel allocation mode information in step 605. Then, the neighboring BS returns to step 603 and determines whether it receives a UL pilot from the MS. Here, the UL pilot is received the number (T) of times of iteration. The neighboring BS terminates the process when it no longer receives a UL pilot from the MS. However, prior to termination of the process, in step 607, the neighboring BS transmits UL channel state information of the MS to the serving BS of the MS.

Figure 7:
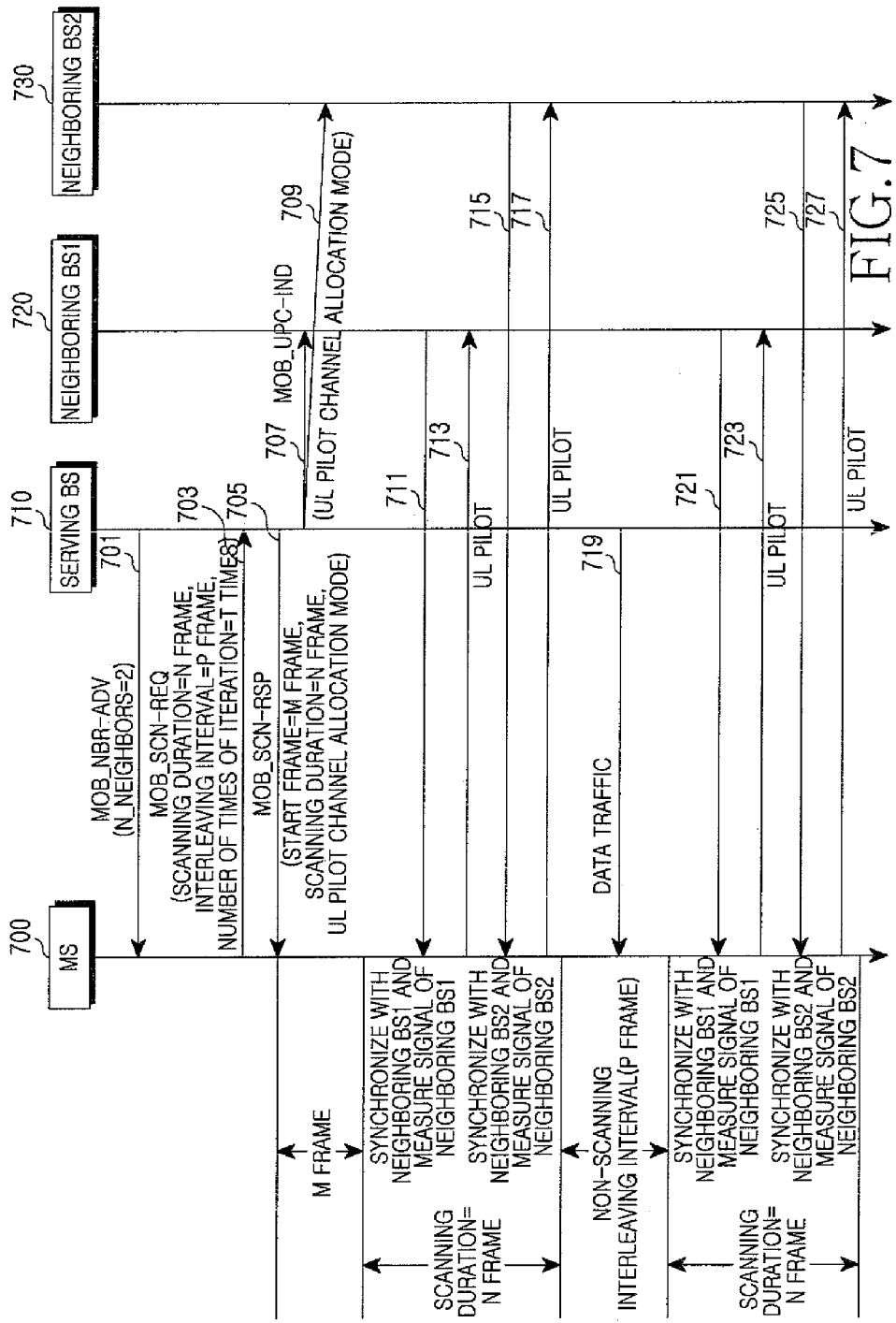
FIG. 7 is a ladder diagram illustrating a process of neighboring BS scanning and pilot transmission in an MS in the case of requiring separate synchronization in a mobile communication system according to an exemplary embodiment of the present invention.

FIG. 7 is a ladder diagram illustrating a process of neighboring BS scanning and pilot transmission by an MS in the case of requiring separate synchronization in a mobile communication system according to an exemplary embodiment of the present invention. FIG. 7 shows an exemplary embodiment for the case where a CP offset of a neighboring BS signal does not correspond to a CP interval of an MS signal, that is, for the case where synchronization between an MS and a neighboring BS is not matched.

Referring to FIG. 7, steps 701 to 709 are substantially identical with steps 301 to 309 of FIG. 3 and thus, are not again described for the sake of convenience.

If the MOB_SCN-RSP message is received, the MS 700 measures a DL channel state of a neighboring BS after performing synchronization with the neighboring BS during a scanning duration of an N frame after an M frame and transmits a UL pilot to the synchronized neighboring BS in a UL pilot channel allocation mode without separate synchronization during a next adjacent UL interval. In other words, in step 711, the MS 700 performs synchronization with a neighboring BS1 720 and measures a DL channel state with the neighboring BS1 720. That is, the MS 710 performs scanning using a DL signal of the neighboring BS1 720 and, in step 713, transmits a UL pilot to the neighboring BS1 720 in the UL pilot channel allocation mode without separate synchronization during a next adjacent UL interval. Then, in step 715, the MS 700 performs synchronization with a neighboring BS2 730 and measures a DL channel state with the neighboring BS2 730. That is, the MS 710 performs scanning using a DL signal of the neighboring BS2 730 and, in step 717, transmits a UL pilot to the neighboring BS2 730 in the UL pilot channel allocation mode without separate synchronization during a next adjacent UL interval. Data transmission/reception cannot be implemented during the scanning duration and the UL pilot transmission is performed at any UL frame interval during the N frame interval that is the scanning duration. The neighboring BSs 720 and 730 can measure UL channel states with the MS 700.

Then, the MS 700 stops the scanning operation during a non-scanning interleaving interval (a P frame). At this time, in step 719, a serving BS 710 can transmit data to the MS 700 using the non-scanning interleaving interval (P frame) when there is data to be transmitted.

After that, the steps 711 to 719 are repeatedly executed by the number of times of iteration (T) for example as illustrated in steps 721, 723, 725 and 727.

The scanning can be either implemented sequentially with respective neighboring BSs included in the MOB_NBR-ADV message or can be implemented by group of neighboring BSs having similar CP offsets.

An MS according to an exemplary embodiment of the present invention measures a remnant power amount, determines a reference BS depending on the remnant power amount, and allocates power of a UL pilot taking into consideration only neighboring BSs that are located closer to the MS than the reference BS among neighboring BSs included in a MOB_NBR-ADV message. For example, in cases where an MS secures sufficient power, the MS can set a reference BS as a neighboring BS that is located farthest away from the MS among the neighboring BSs included in the MOB_NBR-ADV message, thereby allocating power of a UL pilot taking all candidate neighboring BSs for handover into consideration. In other words, the MS allocates power taking into consideration even a BS having the lowest possibility to be set as a target BS in view of a physical position. For another example, in cases where an MS secures less power, the MS can determine a reference BS as a neighboring BS that is located closest to the MS among the neighboring MSs included in the MOB_NBR-ADV message, thereby allocating power of a UL pilot adapted for a BS having the highest possibility to be set as a target BS in view of a physical position at the time of occurrence of handover.

Alternatively, the MS can determine a reference BS as a neighboring BS having a DL channel state greater than a threshold value, wherein the threshold value is determined by the MS. Thereby, the MS allocates power of a UL pilot taking into consideration only neighboring BSs having DL channel states of the required threshold value or more. In other words, in cases where a DL signal level is less than an MS's required threshold value, UL pilot transmission may be excluded from consideration by applying a default mode to corresponding BSs. For power control for the UL pilot, an open loop power control may be performed based on a Received Signal Strength Indication (RSSI) value of DL received data from each neighboring BS.

As described above, exemplary embodiments of the present invention have an advantage in that, if a handover to a neighbor cell or neighbor sector is needed due to a change in the communication environment in a mobile communication system, a neighboring BS can measure a UL channel state between a user MS and the neighboring BS using a UL pilot at the time a scanning operation for a DL channel state is performed, in order to increase the reliability and accuracy of handover decision. Accordingly, both a DL QoS and a UL QoS are considered at the time the handover decision is made. Further, exemplary embodiments of the present invention have an advantage in that UL pilot transmission is adaptively applicable depending on the power demand/supply ability of an MS by differently allocating power depending on a power control reference BS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for scanning in a Mobile Station (MS) of a mobile communication system, the method comprising:
   receiving a scanning response message including information on an UpLink (UL) pilot channel allocation mode from a serving Base Station (BS);
   determining a DownLink (DL) channel state of each of one or more neighboring BSs using respective DL signals of the one or more neighboring BSs; and
   transmitting a UL pilot, based on the UL pilot channel allocation mode information, to each of the one or more neighboring BSs in the UL pilot channel allocation mode without separate synchronization, during a scanning duration.

2. The method of claim 1, wherein the scanning response message further comprises at least one of information on a start frame for execution of a scanning operation and a scanning duration.

3. The method of claim 1, further comprising:
   stopping a scanning operation; and
   receiving data traffic from the serving BS during an interleaving interval after the scanning duration.

4. The method of claim 1, further comprising:
determining a remnant power amount;
determining a reference BS depending on the remnant power amount; and
allocating power of the UL pilot taking into consideration neighboring BSs located closer to the MS than the reference BS among the one or more neighboring BSs.

5. The method of claim 1, further comprising allocating power of the UL pilot taking into consideration neighboring BSs having DL channel states greater than or equal to a required threshold value among the one or more neighboring BSs.

6. The method of claim 5, wherein UL pilots are not transmitted to neighboring BSs having DL channel states of less than the required threshold value among the one or more neighboring BSs.

7. A method for scanning in a Mobile Station (MS) of a mobile communication system, the method comprising:
receiving a scanning response message including information on an UpLink (UL) pilot channel allocation mode from a serving Base Station (BS); and
performing synchronization with each of one or more neighboring BSs;
determining a DownLink (DL) channel state using a DL signal of each of the one or more neighboring BSs; and
transmitting a UL pilot, based on the UL pilot channel allocation mode information, to the synchronized neighboring one or more BS in the UL pilot channel allocation mode, during a scanning duration,
wherein the information on the UL pilot channel allocation mode comprises information that enables the one or more neighboring BSs to receive UL pilots from the MS.

8. The method of claim 7, wherein the scanning response message further comprises at least one of information on a start frame for execution of a scanning operation and a scanning duration.

9. The method of claim 7, further comprising:
stopping a scanning operation; and
receiving data traffic from the serving BS during an interleaving interval after the scanning duration.

10. The method of claim 7, further comprising:
determining a remnant power amount;
determining a reference BS depending on the remnant power amount; and
allocating power of the UL pilot taking into consideration neighboring BSs located closer to the MS than the reference BS among the one or more neighboring BSs.

11. The method of claim 7, further comprising:
allocating power of the UL pilot taking into consideration neighboring BSs having DL channel states greater than or equal to a required threshold value among the one or more neighboring BSs.

12. The method of claim 11, wherein UL pilots are not transmitted to neighboring BSs having DL channel states less than the required threshold value among the one or more neighboring BSs.

13. The method of claim 7, wherein the determining of the DL channel state and the transmitting of the UL pilot are performed sequentially with each of the one or more neighboring BSs.

14. The method of claim 7, wherein the determining of the DL channel state and the transmitting of the UL pilot are performed by group of neighboring BSs having similar Cyclic Prefix (CP) offsets.

15. An information forwarding method for scanning in a Base Station (BS) of a mobile communication system, the method comprising:
receiving a scanning request message from a Mobile Station (MS);
transmitting a scanning response message comprising UpLink (UL) pilot channel allocation mode information to the MS; and
transmitting UL pilot channel instruction messages comprising the UL pilot channel allocation mode information to each of one or more neighboring BSs,
wherein the UL pilot channel allocation mode information comprises information on which the MS bases a UL pilot and which enables the one or more neighboring BSs to receive UL pilots from the MS.

16. The method of claim 15, wherein the UL pilot channel instruction message comprises information of at least one of a number of the entire UL pilot symbol, a decimation value representing on which subcarrier to generate a pilot, information representing whether to randomize a decimation offset, a UL pilot symbol index to be used by a Connection IDentifier (CID) sharing a pilot symbol, a number of CIDs sharing a pilot symbol, each CID expressed by a Least Significant Bit (LSB) of 12 bits, a UL pilot power control method, use or non-use of a multi-antenna, a starting frequency band, and a number of neighbor frequency bands used for the pilot.

17. A method for scanning in a mobile communication system comprising:
transmitting, by a Mobile Station (MS), a scanning request message to a serving Base Station (BS);
transmitting, by the serving BS, a scanning response message comprising UpLink (UL) pilot channel allocation mode information to the MS; and
transmitting, by the serving BS, UL pilot channel instruction messages comprising the UL pilot channel allocation mode information to each of one or more neighboring BSs,
wherein the UL pilot channel allocation mode information comprises information on which the MS bases a UL pilot.

18. The method of claim 17, wherein the UL pilot channel instruction message comprises information of at least one of a number of the entire UL pilot symbol, a decimation value representing on which subcarrier to generate a pilot, information representing whether to randomize a decimation offset, a UL pilot symbol index to be used by a Connection IDentifier (CID) sharing a pilot symbol, number of CIDs sharing a pilot symbol, each CID expressed by a Least Significant Bit (LSB) of 12 bits, a UL pilot power control method, use or non-use of a multi-antenna, a starting frequency band, and a number of neighbor frequency bands used for the pilot.

19. The method of claim 17, further comprising:
determining, by the MS, each DownLink (DL) channel state using DL signals of the one or more neighboring BSs; and
transmitting, by the MS, the UL pilot based on the UL pilot channel allocation mode information to each of the one or more neighboring BSs in a UL pilot channel allocation mode, during a scanning duration.

20. The method of claim 19, further comprising:
receiving, by each of the one or more neighboring BSs, the UL pilot from the MS using the UL pilot channel allocation mode information;
determining, by each of the one or more neighboring BSs, a UL channel state of the MS using the received UL pilot; and
transmitting, by each of the one or more neighboring BSs, information on the UL channel state of the MS to the serving BS.

21. The method of claim 17, further comprising:
performing, by the MS, synchronization with each of the one or more neighboring BSs;
determining, by the MS, a DL channel state using a DL signal of each of the one or more neighboring BSs; and
transmitting, by the MS, the UL pilot to the synchronized one or more neighboring BSs in a UL pilot channel allocation mode, during a scanning duration.

22. The method of claim 21, further comprising:
receiving, by each of the one or more neighboring BSs, the UL pilot from the MS using the UL pilot channel allocation mode information;
determining, by each of the one or more neighboring BSs, a UL channel state of the MS using the received UL pilot; and
transmitting, by each of the one or more neighboring BSs, information on the UL channel state of the MS to the serving BS.

23. An apparatus for scanning in a mobile communication system, comprising:
a Mobile Station (MS) for transmitting a scanning request message to a serving Base Station (BS); and
the serving BS for transmitting a scanning response message comprising UpLink (UL) pilot channel allocation mode information to the MS and for transmitting UL pilot channel instruction messages comprising the UL pilot channel allocation mode information to each of one or more neighboring BSs,
wherein the UL pilot channel allocation mode information comprises information on which the MS bases a UL pilot and which enables the one or more neighboring BSs to receive UL pilots from the MS.

24. The apparatus of claim 23, wherein the UL pilot channel instruction message comprises information of at least one of a number of the entire UL pilot symbol, a decimation value representing on which subcarrier to generate a pilot, information representing whether to randomize a decimation offset, a UL pilot symbol index to be used by a Connection IDentifier (CID) sharing a pilot symbol, number of CIDs sharing a pilot symbol, each CID expressed by a Least Significant Bit (LSB) of 12 bits, a UL pilot power control method, use or non-use of a multi-antenna, a starting frequency band, and a number of neighbor frequency bands used for the pilot.

25. The apparatus of claim 23, wherein the MS determines each DownLink (DL) channel state using DL signals of the neighboring BSs and simultaneously transmits the UL pilot to the entire neighboring BS in a UL pilot channel allocation mode, during a scanning duration.

26. The apparatus of claim 25, wherein each of the one or more neighboring BSs receives the UL pilot from the MS using the UL pilot channel allocation mode information, measures a UL channel state with the MS using the received UL pilot, and transmits information on the UL channel state with the MS to the serving BS.

27. The apparatus of claim 23, wherein the MS performs synchronization with each of the one or more neighboring BSs, measures a DL channel state using a DL signal of each of the one or more neighboring BSs, and transmits the UL pilot to each of the synchronized one or more neighboring BSs in a UL pilot channel allocation mode, during a scanning duration.

28. The apparatus of claim 27, wherein each of the one or more neighboring BSs receives the UL pilot from the MS using the UL pilot channel allocation mode information, measures a UL channel state of the MS using the received UL pilot, and transmits information on the UL channel state of the MS to the serving BS.

29. A Mobile Station (MS) for scanning comprising:
means for receiving a scanning response message including information on a UpLink (UL) pilot channel allocation mode from a serving Base Station (BS); and
means for measuring each DownLink (DL) channel state using DL signals of each of one or more neighboring BSs and transmitting a UL pilot based on the UL pilot channel allocation mode information to each of the one or more neighboring BSs in the UL pilot channel allocation mode during a scanning duration,
wherein the information on the UL pilot channel allocation mode comprises information that enables the one or more neighboring BSs to receive UL pilots from the MS.

30. A Mobile Station (MS) for scanning, comprising:
means for receiving a scanning response message including information on an UpLink (UL) pilot channel allocation mode from a serving Base Station (BS); and
means for performing synchronization with each of one or more neighboring BSs, measuring a DownLink (DL) channel state using a DL signal of each of the one or more neighboring BSs, and transmitting a UL pilot based on the UL pilot channel allocation mode information to each of the synchronized one or more neighboring BSs in the UL pilot channel allocation mode during a scanning duration,
wherein the information on the UL pilot channel allocation mode comprises information that enables the one or more neighboring BSs to receive UL pilots from the MS.

* * * * *